US006914668B2

(12) United States Patent
Brestel et al.

(10) Patent No.: US 6,914,668 B2
(45) Date of Patent: Jul. 5, 2005

(54) PERSONAL IDENTIFICATION VERIFICATION AND CONTROLLED SUBSTANCE DETECTION AND IDENTIFICATION SYSTEM

(75) Inventors: Mordechai Brestel, Rehovot (IL); Michael Gaft, Rishan Lezion (IL); Uzi Sharon, Tel-Aviv (IL); Gabriel Vago, London (GB)

(73) Assignee: International Technologies (Laser) Ltd., Rishon Lezion (IL)

( * ) Notice: Subject to any disclaimer, the term of this patent is extended or adjusted under 35 U.S.C. 154(b) by 50 days.

(21) Appl. No.: 10/437,507

(22) Filed: May 14, 2003

(65) Prior Publication Data

US 2004/0227929 A1 Nov. 18, 2004

(51) Int. Cl.[7] .......................... G01J 3/30; G01N 21/64; G01N 21/65

(52) U.S. Cl. .......................... 356/72; 356/71; 356/301; 356/318

(58) Field of Search .......................... 356/72, 317, 318, 356/301

(56) References Cited

U.S. PATENT DOCUMENTS

| | | | | |
|---|---|---|---|---|
| 5,255,067 | A | | 10/1993 | Carrabba et al. |
| 5,383,200 | A | | 1/1995 | Barrett et al. |
| 5,483,601 | A | | 1/1996 | Faulkner |
| 5,609,744 | A | | 3/1997 | Zenharusern et al. |
| 5,638,166 | A | | 6/1997 | Funsten et al. |
| 5,697,373 | A | | 12/1997 | Kortum et al. |
| 5,728,584 | A | | 3/1998 | Sausa et al. |
| 5,759,859 | A | | 6/1998 | Sausa |
| 5,760,898 | A | | 6/1998 | Haley et al. |
| 5,812,261 | A | | 9/1998 | Nelson et al. |
| 5,818,047 | A | | 10/1998 | Chaney et al. |
| 5,826,214 | A | | 10/1998 | Lieb et al. |
| 5,847,825 | A | | 12/1998 | Alexander |
| 5,866,430 | A | * | 2/1999 | Grow ......................... 436/172 |
| 5,906,946 | A | | 5/1999 | Sausa et al. |
| 5,912,466 | A | | 6/1999 | Funsten et al. |
| 6,002,471 | A | | 12/1999 | Quake |
| 6,002,478 | A | | 12/1999 | Zhu |
| 6,008,896 | A | | 12/1999 | Sabsabi et al. |
| 6,069,695 | A | | 5/2000 | Rohr et al. |
| 6,081,330 | A | | 6/2000 | Nelson et al. |
| 6,147,754 | A | | 11/2000 | Theriault et al. |
| 6,154,708 | A | | 11/2000 | Koashi |
| 6,157,037 | A | | 12/2000 | Danielson |
| 6,160,255 | A | | 12/2000 | Sausa |
| 6,268,125 | B1 | | 7/2001 | Perkins |
| 6,278,518 | B1 | | 8/2001 | Schrof et al. |
| 6,518,584 | B1 | | 2/2003 | Woodruff |

FOREIGN PATENT DOCUMENTS

| | | | | |
|---|---|---|---|---|
| WO | WO 00/23958 | * | 4/2000 | ........... G08B/13/00 |
| WO | WO 01/40773 | | 6/2001 | |

OTHER PUBLICATIONS

Jehuda Yinon, "Forensic and Environmental Detection of Explosives", John Wiley & Sons Ltd. (1999).

L. Smilowitz, et al, Abstracts, Jun. 2001 SHOCK 01 Session L2–DE.

(Continued)

*Primary Examiner*—F. L. Evans
(74) *Attorney, Agent, or Firm*—Ladas and Parry LLP

(57) ABSTRACT

A personal identification and security system including a personal identification verification system, a controlled substance detection and identification system and an alarm indicator responsive to outputs of the personal identification verification system and the controlled substance detection and identification system for providing an alarm indication in response to fulfillment of alarm criteria in at least one of the outputs.

7 Claims, 2 Drawing Sheets

OTHER PUBLICATIONS

C. Cheng et al, J. of Forensic Sciences, 1995, 40 pp 31–37.

K. Horton et al, Abstracts, Lunar and Planetary Science XXXII (2001).

Brochure: InPhotote™ Portable Raman Spectrometer, 2000.

T. Arusi–Parpar, et al, "Photodissociation followed by laser–induced fluorescence at atmospheric pressure and 24 C : a unique scheme for remote detection of explosives", Dec. 2001, Applied Optics, vol. 40, No. 36, pp. 6677–6681.

G. Mizutani, et al, "Detection of starch granules in a living plant by optical second harmonic microscopy", Journal of Luminscence 87–89 (2000) 824–826.

N.G.Paulter, "Guide to the technologies of concealed weapon and contraband imaging and detection", NIG Guide 602–00. Feb. 2001.

J.I. Steinfeld, et al, "Explosives Detection: A Challange for Physical Chemistry", Annu. Rev. Phys. Chem. 1998, 49:203–32.

C.Bruschini, Comercial Systems for the Direct of Explosives (for Explosives Tasks), ExploStudy, Final Report, Feb. 17, 2001.

L. V.Haley, et al, "Laser Based Explosives Detection", pp. 207–217, 2000.

* cited by examiner

PERSONAL IDENTIFICATION VERIFICATION AND CONTROLLED SUBSTANCE DETECTION AND IDENTIFICATION SYSTEM

FIELD OF THE INVENTION

The present invention relates to the field of security identification, and more specifically to the area of personal security identification.

BACKGROUND OF THE INVENTION

Personal identification and security checks form an integral portion of maintaining security in a wide variety of environments, ranging from transportation terminals, such as airports, to controlled access environments, such as military installations. A variety of systems and methods exist in the art for providing personal identification, such as photo identification tags, which are scanned for entry, and biometric personal identification systems that compare personal biometric information to previously stored biometric information. Additionally, a variety of systems and methods are known in the art for controlled substance detection and identification.

The following U.S. Pat. Nos. are believed to represent the current state of the art:

U.S. Pat. Nos. 6,518,584; 5,818,047; 5,483,601 and 5,255,067.

SUMMARY OF THE INVENTION

The present invention seeks to provide enhanced personal identification and security systems and methodologies.

There is thus provided in accordance with a preferred embodiment of the present invention a personal identification and security system including a personal identification verification system, a controlled substance detection and identification system and an alarm indicator responsive to outputs of the personal identification verification system and the controlled substance detection and identification system for providing an alarm indication in response to fulfillment of alarm criteria in at least one of the outputs.

In accordance with a preferred embodiment of the present invention the personal identification verification system is a biometric information comparison system.

In accordance with another preferred embodiment of the present invention the controlled substance detection and identification system is a spectroscopic controlled substance detection and identification system. Additionally, the spectroscopic controlled substance detection and identification system is a laser activated spectroscopic controlled substance detection and identification system.

In accordance with yet another preferred embodiment of the present invention the personal identification verification system and the controlled substance detection and identification system perform personal identification verification and controlled substance detection and identification substantially simultaneously.

In accordance with yet another preferred embodiment of the present invention a person having their identity verified by the personal identification verification system is unaware of the presence of the controlled substance detection and identification system.

There is also provided in accordance with another preferred embodiment of the present invention a personal identification and security method including providing personal identification verification, simultaneously detecting and identifying controlled substances and providing an alarm indication in response to fulfillment of alarm criteria in at least one of the providing personal identification verification and the detecting and identifying controlled substances.

Preferably, the providing personal identification verification includes providing biometric based personal identification verification. Additionally or alternatively, the detecting and identifying controlled substances includes spectroscopically detecting and identifying controlled substances.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
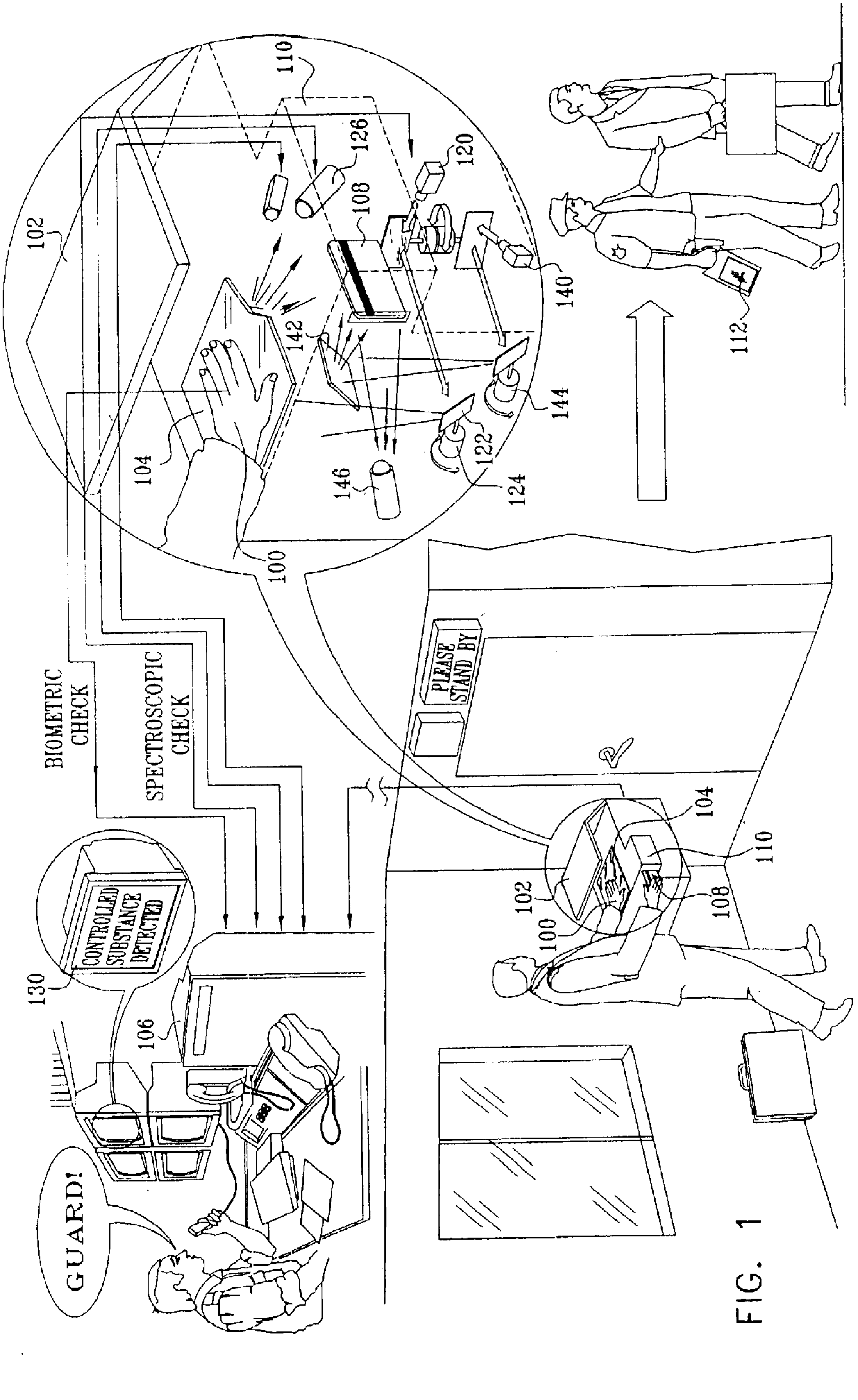
FIG. 1 is a simplified pictorial illustration of a personal identification and security system combining biometric and spectroscopic components, constructed and operative in accordance with a preferred embodiment of the present invention.

Reference is now made to FIG. 1, which is a simplified pictorial illustration of a personal identification and security system, constructed and operative in accordance with a preferred embodiment of the present invention. In the illustrated embodiment of FIG. 1, a personal identification screening system is shown, it being appreciated that the present invention is not limited to the illustrated embodiment, but rather may be employed in any other suitable personal security identification environment.

As seen in FIG. 1, a person seeking entrance to a secure area presents a body portion 100 suitable for biometric personal identification verification, such as a hand, at personal identification and security station 102. In a most preferred embodiment of the present invention, the body portion 100 presented for biometric personal identification verification includes one or more fingers. The personal identification and security station 102 preferably includes a biometric personal identification verification system for identification verification and a spectroscopic controlled substance detection and identification system to scan for the possible presence of controlled substances, such as explosives or drugs, on the body portion 100. It is appreciated that the personal identification and security station 102, from the perspective of the person seeking entrance, is preferably similar in appearance to a conventional biometric personal identification verification system. The spectroscopic controlled substance detection and identification system may include any of the embodiments of the spectroscopic controlled substance detection system which are disclosed in the assignee's copending U.S. patent application Ser. No. 10/428,398, titled "CONTROLLED SUBSTANCE DETECTION AND IDENTIFICATION SYSTEM", filed May 2, 2003, incorporated herein by reference. Alternatively, the controlled substance detection and identification system can be a non-spectroscopic controlled substance detection and identification system.

In accordance with a preferred embodiment of the present invention, the personal identification and security station 102 includes a transparent substrate 104 upon which the body portion 100 is placed. Preferably, the biometric personal identification verification and the spectroscopic detection and identification are performed, preferably simultaneously, while body portion 100 is resting on the transparent substrate 104. Preferably, the transparent substrate 104 is made of a material that does not exhibit characteristic Second Harmonic (SH), Raman Scattering (RS) and Luminescence (LE) under the parameters defined for use in identifying controlled substances. Even more preferably, the substrate 104 is coated with a thin layer of a substance that may exhibit Surface Enhanced Raman Spectrum (SERS), such as silver, gold or copper, having a suitably roughened surface. With such an appropriate surface, molecules of controlled substances, such as explosives or drugs, may exhibit SERS, which increases the visibility of the RS by a factor of 10 or more.

In the illustrated embodiment, the biometric personal identification verification system includes a biometric information collector that captures biometric information from body portion 100 and transmits the information to a biometric information comparison device, such as a computer 106. The biometric information comparison device then compares the information captured by the biometric information collector with stored biometric information to verify the identity of the person seeking entrance. The stored biometric information may be stored on any conventional device that is in communication with the biometric information comparison device or may be contained within the biometric information comparison device.

In accordance with another preferred embodiment, the identification information is stored on an identification document 108, such as a digital identification document or smart card, which is presented by the person and scanned by an identification document reader 110. The identification information scanned from the identification document 108 is transmitted to the biometric information comparison device, which then compares the identification information scanned from the identification document 108 with the information captured by the biometric information collector.

In accordance with another preferred embodiment of the present invention, the personal identification and security station 102 may also include a biometric imager (not shown), which transmits the biometric information as an image of the body portion 100 to computer 106. Computer 106 is operative to generate the biometric information, such as finger length or other suitable biometric information or measurement, by processing the image of body portion 100. Additionally, the stored identification information may be stored as a corresponding image of body portion 100. Additionally, the imager may generate a printed image 112 for use by security personnel. It is appreciated that any suitable biometric information comparison system, either with or without an imager, may be utilized.

In the illustrated embodiment, the spectroscopic system of the personal identification and security station 102 employs at least one light source, such as a laser 120. An output beam of laser 120 impinges on one or more scanning elements 122, such as mirrors, which are driven in rotational motion by one or more motors 124 in synchronization with the pulsed output of laser 120 in response to synchronization signals, such as signals provided by computer 106.

In accordance with a preferred embodiment of the present invention, laser 120 is preferably a Nd:YAG pulsed laser emitting first, second, third and forth harmonics having peak wavelengths at 1064, 532, 355 and 266 mm. Alternatively, multiple lasers, preferably Nd:YAG pulsed lasers, may be provided. It is appreciated that wavelengths in the range of 200 nm to 10 microns may be employed.

The output beam of laser 120 is thus scanned over the body portion 100, inducing SH, RS and LE by certain materials, including controlled substances, such as explosives and drugs, should those materials be present on the scanned surfaces of the body portion 100. The emitted and scattered light is detected by one or more detector assemblies 126, preferably including collecting optics, a notch filter, a spectral filter, a polychromator and a gated detector, such as a photodiode, photo multiplier, CCD or CMOS.

Preferably, a laser wavelength of 1064 nm is used for SH generation and the spectral filter, such as a filter having a narrow passband centered on 532 nm, is used for SH detection. Preferably, a laser wavelength of 532 nm is used for RS generation and the notch filter, such as a narrowband filter centered on 532 nm, is used for RS detection. The polychromator preferably has a spectral range from 360 to 900 nm.

Preferably, the gating interval for SH and RS detection coincides with duration of the laser pulse, while the interval for LE detection starts with the beginning of the laser pulse and continues beyond the end of the pulse for a time period based on the decay time of the luminescence emission. Alternatively, the detector need not be gated, although this is not preferred.

Alternatively, the polychromator may be replaced by a spectroscopic system employing several filters for RS and LE detection. The following Raman shifts relative to the laser excitation wavelength are preferably provided, each by a different spectral filter:

880–885 $cm^{-1}$

1360–1365 $cm^{-1}$

1270–1290 $cm^{-1}$

2980–3000 $cm^{-1}$.

The following spectral ranges are preferably provided for LE detection, each by a different spectral filter and corresponding to the following gate intervals:

400–430 nm—100 nanoseconds

450–540 nm—10 nanoseconds.

If more than threshold amounts of any of SH, RS and LE are received by any one or more gated detector during the corresponding time interval and in its spectral range, an alarm indication is provided by computer 106, typically at a display 130. Alternatively, for some controlled substances, the spectroscopic scanning system of personal identification and security station 102 may require a positive response from at least two or more of the spectroscopic identifiers for an alarm indication to be provided. This alarm indication indicates that a controlled substance having certain spectroscopic characteristics may be present on the body portion 100. Additionally, if the biometric information captured by the biometric information collector of personal identification and security station 102 from body portion 100 do not correspond to the stored identification information, scanned from the identification document 108 or retrieved from the stored location, an alarm indication is provided by computer 106, typically at display 130. This alarm indication indicates that the biometric information comparison device was unable to identify the person.

It is noted that, even though the embodiments described hereinabove describe the spectroscopic system including detector assemblies, imaging optics, filters, polychromator, detector assemblies, any suitable configuration of components, such as incorporating a fiber optic link for remote detection, may be used for collecting and analyzing the scattered output from the laser. Additionally, the spectroscopic system may be a non-laser activated spectroscopic system.

In accordance with another preferred embodiment of the present invention, the personal document reader 110 of personal identification and security station 102 is also operative to spectroscopically analyze identification document 108. In this embodiment, the spectroscopic system of the personal identification document reader 110 preferably employs at least one light source, such as a laser 140. An output beam of laser 140 impinges on one or more scanning elements 142, such as mirrors, which are driven in rotational motion by one or more motors 144 in synchronization with the pulsed output of laser 140 in response to synchronization signals, such as signals provided by computer 106.

In accordance with a preferred embodiment of the present invention, laser 140 is preferably a Nd:YAG pulsed laser emitting first, second, third and forth harmonics having peak wavelengths at 1064, 532, 355 and 266 nm. Alternatively, multiple lasers, preferably Nd:YAG pulsed lasers, may be provided. It is appreciated that wavelengths in the range of 200 nm to 10 microns may be employed.

The output beam of laser 140 is thus scanned over the identification document 108, inducing SH, RS and LE by certain materials, including controlled substances, such as explosives and drugs, should those materials be present on the scanned surfaces of the identification document 108. The emitted and scattered light is detected by one or more detector assemblies 146, preferably including collecting optics, a notch filter, a spectral filter, a polychromator and a gated detector, such as a photodiode, photo multiplier, CCD or CMOS.

Preferably, a laser wavelength of 1064 nm is used for SH generation and the spectral filter, such as a filter having a narrow passband centered on 532 nm, is used for SH detection. Preferably, a laser wavelength of 532 nm is used for RS generation and the notch filter, such as a narrowband filter centered on 532 nm, is used for RS detection. The polychromator preferably has a spectral range from 360 to 900 nm.

Preferably, the gating interval for SH and RS detection coincides with duration of the laser pulse, while the interval for LE detection starts with the beginning of the laser pulse and continues beyond the end of the pulse for a time period based on the decay time of the luminescence emission. Alternatively, the detector need not be gated, although this is not preferred.

Alternatively, the polychromator may be replaced by a spectroscopic system employing several filters for RS and LE detection. The following Raman shifts relative to the laser excitation wavelength are preferably provided, each by a different spectral filter:

880–885 $cm^{-1}$

1360–1365 $cm^{-1}$

1270–1290 $cm^{-1}$

2980–3000 $cm^{-1}$.

The following spectral ranges are preferably provided for LE detection, each by a different spectral filter and corresponding to the following gate intervals:

400–430 nm—100 nanoseconds

450–540 nm—10 nanoseconds.

If more than threshold amounts of any of SH, RS and LE are received by any one or more gated detector during the corresponding time interval and in its spectral range, an alarm indication is provided by computer 106, typically at display 130. This alarm indication indicates that a controlled substance having certain spectroscopic characteristics may be present on the identification document 108.

It is noted that, even though the embodiments described hereinabove describe the spectroscopic system including detector assemblies, imaging optics, filters, polychromator, detector assemblies, any suitable configuration of components, such as incorporating a fiber optic link for remote detection, may be used for collecting and analyzing the scattered output from the laser.

In accordance with another preferred embodiment of the present invention, the identification document 108 is made from a material that does not exhibit characteristic SH, RS and LE under the parameters defined for use in identifying controlled substances. Even more preferably, the identification document 108 is coated with a thin layer of a substance that may exhibit Surface Enhanced Raman Spectrum (SERS), such as silver, gold or copper, having a suitably roughened surface. With such an appropriate surface, molecules of controlled substances may exhibit Surface Enhanced Raman Spectrum (SERS), increasing the visibility of the RS by a factor of 10 or more.

It is appreciated that, even though the illustrated embodiment of FIG. 1 shows the identification document reader 110 including laser 140, scanning elements 142, motors 144 and detector assemblies 146, identification document reader 110 may also utilize any or all of laser 120, scanning elements 122, motors 124 and detector assemblies 126 from scanning and recognition station 102.

It is appreciated that the operational parameters for the spectroscopic systems of the scanning and recognition station 102 and identification document reader 110 are preferably selected so as to provide optimal contrast between the substances being identified and the background.

It is further appreciated that, while in a preferred mode of the present invention the spectroscopic systems of the scanning and recognition station 102 and identification document reader 110 scan for SH, RS and LE, spectroscopic analysis of body portion 100 and/or identification document 108 may include any combination of one or more of these or other spectroscopic analysis methods. Additionally, these spectroscopic analysis methods may include methods not requiring a laser or a light source, but utilizing ambient light, such as measuring optical absorption spectra, optical reflection spectra or ATR.

Figure 2:
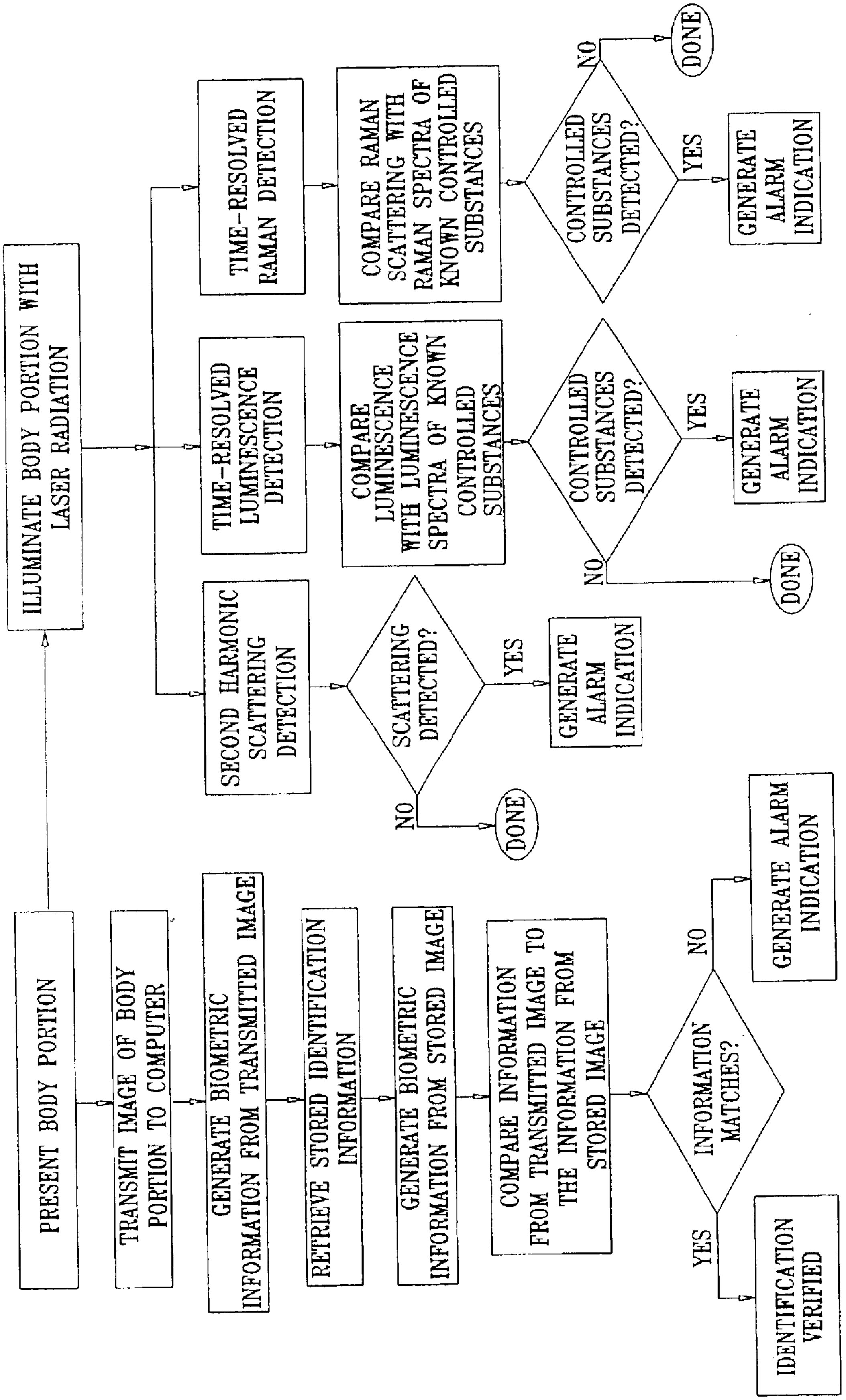
FIG. 2 is a simplified flowchart illustrating operation of the personal identification and security system of FIG. 1, in accordance with a preferred embodiment of the present invention.

Reference is now made to FIG. 2, which is a simplified flowchart illustrating operation of the scanning and recognition station 102 shown in FIG. 1, in accordance with a preferred embodiment of the present invention. As shown in FIG. 2, a body portion, such as body portion 100 of FIG. 1, is presented for biometric personal identification verification. In a preferred embodiment of the present invention, the image of the body portion 100 is transmitted to a biometric information comparison device, such as a computer 106 of FIG. 1, which generates the biometric information from the transmitted image. The computer 106 is then operative to retrieve stored identification information for comparison. In the embodiment described in FIG. 2, the stored identification information is retrieved from an identification document, such as identification document 108 of FIG. 1, preferably also in the form of an image of the body portion 100. Computer 106 is then operative to generate biometric information from the stored image, and comparing that information to the information generated from the image of body portion 100 presented by the person for personal identification verification. Alternatively, computer 106 is operative to compare the stored image of body portion 100 with the image transmitted by the biometric information collector of scanning and recognition station 102.

It is appreciated that the biometric information comparison device may generate any conventional biometric information that is deemed suitable for identification. It is also appreciated that any suitable biometric personal identification verification system may be utilized.

If the biometric information generated by the biometric information collector of scanning and recognition station 102 from body portion 100 do not correspond to the stored identification information, an alarm indication is provided by computer 106.

Alternatively, the stored identification information may be located on a storage device in communication with computer 106, or on a storage device forming part of computer 106. In this embodiment, the person presenting body portion 100 also enters an identification code to enable computer 106 to locate the corresponding stored identification information. Additionally, the computer 106 may confirm that the identification code was correctly entered.

The body portion 100, presented for biometric information recognition as described hereinabove, is also examined for the possible presence of controlled substances, such as explosives or drugs, thereon. Body portion 100 is preferably illuminated by laser radiation, as described in FIG. 1, and is subject to detection of second harmonic scattering, time-resolved detection of luminescence and time-resolved detection of Raman scattering to provide identification of controlled substances.

In the illustrated embodiment, controlled substances are detected and identified using a combination of second harmonic scattering, time-resolved luminescence and time-resolved Raman scattering. If controlled substances are detected, as described in assignee's copending U.S. patent application Ser. No. 10/428,398, titled "CONTROLLED SUBSTANCE DETECTION AND IDENTIFICATION SYSTEM", filed May 2, 2003, on the body portion 100 an alarm indication is provided by computer 106.

It will be appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specification and which are not in the prior art.

What is claimed is:

1. A personal identification and security system comprising:

a personal identification verification system;

a controlled substance detection and identification system, said personal identification verification system and said controlled substance detection and identification system employing a personal document reader for reading a personal identification document and a spectroscopic analyzer for analyzing said personal identification document to determine whether controlled substances are present thereon; and an alarm indicator responsive to outputs of said personal identification verification system and said controlled substance detection and identification system for providing an alarm indication in response to fulfillment of alarm criteria in at least one of said outputs.

2. A personal identification and security system according to claim 1 and wherein said personal identification verification system is a biometric information comparison system.

3. A personal identification and security system according to claim 1 and wherein said spectroscopic analyzer is a laser activated spectroscopic analyzer.

4. A personal identification and security system according to claim 1 and wherein said personal identification verification system and said controlled substance detection and identification system perform personal identification verification and controlled substance detection and identification substantially simultaneously.

5. A personal identification and security system according to claim 1 and wherein a person having their identity verified by said personal identification verification system is unaware of the presence of said controlled substance detection and identification system.

6. A personal identification and security method comprising:

providing personal identification verification;

simultaneously detecting and identifying controlled substances, said providing personal identification verification and said detecting and identifying controlled substances comprising reading a personal identification document and spectroscopically analyzing said personal identification document to determine whether controlled substances are present thereon;

providing an alarm indication in response to fulfillment of alarm criteria in at least one of said providing personal identification verification and said detecting and identifying controlled substances.

7. A personal identification and security system according to claim 6 and wherein said providing personal identification verification comprises providing biometric based personal identification verification.

* * * * *